Dec. 23, 1952     S. F. GORSKE ET AL     2,622,450

TRANSMISSION AND CLUTCH MECHANISM

Filed Dec. 27, 1948

INVENTORS
STANLEY F. GORSKE
CARL P. PEPPER
By George M Soule
ATTORNEY

Patented Dec. 23, 1952

2,622,450

UNITED STATES PATENT OFFICE 2,622,450

TRANSMISSION AND CLUTCH MECHANISM

Stanley F. Gorske, Indianapolis, and Carl P. Pepper, Plainfield, Ind., assignors, by mesne assignments, to The Marquette Metal Products Company, Cleveland, Ohio, a corporation of Ohio Application December 27, 1948, Serial No. 67,523

12 Claims. (Cl. 74—368)

The invention relates to an improved reversible torque transmitting mechanism using at least one overrunning spring clutch, thus indicating the principal object.

Another object is to provide an improved power transmission mechanism having oppositely acting overrunning spring clutches for transmission of torque in opposite directions and at two different speeds in at least one direction through a common output shaft or rotary member, and wherein there is no possibility of the clutches attempting to produce inconsistent effects such as could lock or damage the mechanism.

Another object is to provide an improved transmission gearing employing two constantly meshing gear couples of different ratios operable by manipulation or adjustment of a single control device to drive an output shaft in at least three ways. Other objects and features will become apparent from the following description of the accompanying drawing showing an illustrative mechanism.

Figure 1:
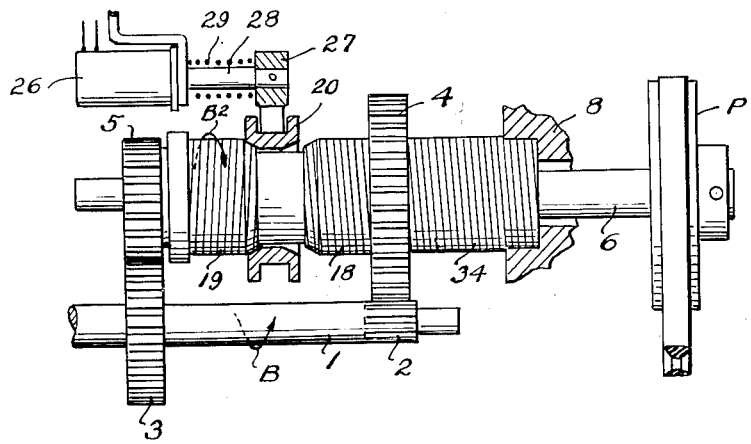
Figure 2:
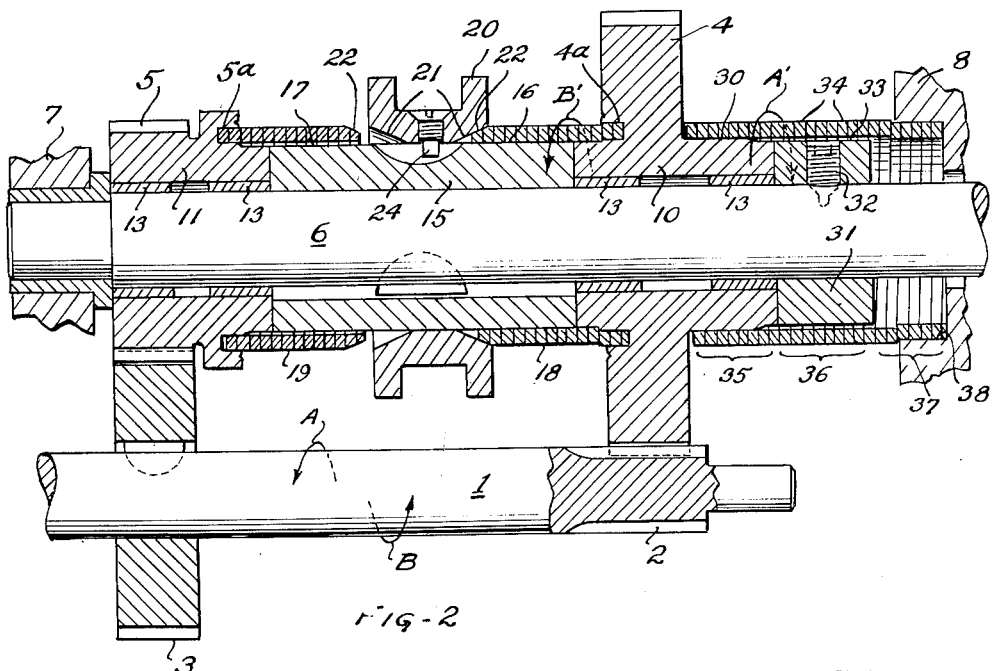

In the drawing, Fig. 1 is a more or less diagrammatic view showing an illustrative gearing and clutch arrangement; Fig. 2 is a central longitudinal sectional view through the principal operating parts of the mechanism.

The gear and clutch mechanism as shown in Fig. 1, is arranged for cyclic or sequential operation of a load represented by the driving pulley P at relatively low speed, first in one direction and then in another, and then at comparatively high speed in one of said directions. Typical utility is represented by laundry machinery wherein the cleansing and draining operations are accomplished during relatively low speed rotation of the pulley sequentially in opposite directions and drying is then accomplished centrifugally by high speed rotation of the pulley in the second direction.

A reversible drive shaft is shown at 1 having drive gears 2 and 3 of different diameters thereon constantly meshing respectively with driven gears 4 and 5 of correspondingly different diameters. The shaft 1 may be operated by a reversible electric motor, not shown. The driven gears are mounted on a common output shaft 6 leading to the pulley P, said shaft being supported in a suitable casing represented by portions 7 and 8. The gears 4 and 5, Fig. 2, may have their hub portions 10 and 11 supported on identical respective sets of bushings 13 around the output shaft. Between the gears 4 and 5 and held in position axially of the shaft 6 thereby is a double clutch drum member 15 keyed to the shaft and providing substantially cylindrical clutch drum surfaces 16 and 17. Helical clutch springs 18 and 19 are fastened respectively to the gears 4 and 5 as by being staked in respective circular recesses 4a and 5a of the gears. The clutch springs have most of their coils normally in loose enveloping or telescoping relation to the drum surfaces 16 and 17 and are energized into gripping relation to those drum surfaces as by an energizing collar 20 shown as having identical conical surfaces 21 at opposite ends adapted to mate frictionally with similar end peripheral surfaces 22 on respective springs. The collar 20 slides on the cylindrical surface of the clutch member 15 between the adjacent ends of the clutch springs and is prevented from turning on the member 15 by a suitable sliding key represented by screw 24.

The clutch springs 18 and 19 as shown in Fig. 1 are oppositely wound, 18 being right, 19 being left, as shown; and assuming the drive shaft 1 is turned in the direction indicated by arrow B, Figs. 1 and 2, the output shaft 6 may be driven selectively in the same direction as indicated at $B^1$ and $B^2$, Figs. 2 and 1 respectively, by shifting the collar 20 from one illustrated position to the other. In the particular arrangement shown the collar is shifted to its Fig. 1 position energizing the clutch spring 19 by a solenoid 26 acting through a shifter fork 27 and operating bar 28 to move the collar 20 to the left. Deenergization of the solenoid enables a spring 29 to move the collar into its right-hand position, Fig. 2, energizing the clutch spring 18.

Driving of the shaft 6 through clutch spring 18 as described is obviously at relatively low speed and driving of the shaft through the clutch spring 19 is at high speed.

For driving the shaft 6 at low speed in a direction reverse of that just described the hub portion 10 of the gear 4 has a rightward extension exteriorly formed to provide a generally cylindrical clutch drum surface 30. A cooperating clutch drum 31 is secured to the shaft 6 as by a set screw 32 providing a cylindrical clutching surface 33. A clutch spring 34 wound the same as clutch spring 18 (right-hand as shown) telescopes the clutch drums 30 and 31, having a group of coils 35 surrounding and normally gripping the drum 30 as by being expanded thereover during assembly, a group of coils 36 surrounding and preferably normally clearing the surface 33 of drum 31 and an additional group of coils 37 extending beyond the drum 31 away from the drum surface 30. Several end coils of the group 37 are contracted into a mating recess or pocket 38 of the housing portion 8.

The drum surface 33 of collar 31 may be of approximately the same diameter as the drum surface 30 so that the group of coils 36 (assuming all coils are of equal diameter when relaxed) would be normally in light friction contact with the drum surface 33 at all times. In that case the contact pressure on part of coils 36 must be less than the pressure of coils 35 on the drum surface 30 in order to insure release of the coils 36 at the proper time as will be explained. The amount of normal or static pressure contact between coils 37 and the pocket 38 and between coils 35 and drum surface 30 is otherwise not particularly critical in either case so long as the respective pressures assure sufficient reactance torque to contract the spring into clutching or locking contact with the drum surface 33 for low speed operation of the shaft 6 in a direction A'.

Assuming such installation as earlier indicated the shaft 6 is first operated in direction A' through the clutch spring 34 at its low speed (as for the washing cycle in the mechanism outlined). The drive shaft 1 for that operation is turned by the motor as indicated by arrow A and torque is transmitted through the clutch spring from the drum surface 30 to the surface 33 of collar 31, thence to the output shaft. Regardless of whether or not the coils 36 initially bear on the drum surface 33 those coils are energized into gripping relation to that drum surface by the overrunning of coils 37 in the pocket 38 thus serving as a reactance friction brake. Energization of the spring is also dependent upon the interference fitting contact of coils 35 or some of them with the drum surface 30. The coils 37 continue to overrun in the pocket 38 at low speed. During the described operation of the shaft 6 in the direction $A^1$ through the clutch spring 34 the clutch energizing collar 20 may be left in energizing contact with the clutch spring 18 since both drum surface supporting members 15 and 31 are keyed to the driven shaft. Thus the selective clutch mechanism actuator collar 20 needs no neutral position.

When the drive shaft 1 is reversed, direction B, (as for the draining cycle in the washing mechanism outlined) the connection just described through clutch spring 34 automatically ceases because as the gear 4 starts in direction $B^1$ the reactance coils 37 of the clutch spring lock tightly in the braking pocket 38 thereby causing all of the coils 36 immediately to release the drum surface 33. Since the reversed direction of rotation of the drum 30 tends to expand the coils 35 away from the drum 30 the latter now overruns freely at low speed with respect to the embracing spring coils. The same reversed direction on part of the gear 4 contracts the clutch spring 18 against the drum surface 16 due to the already established energizing connection between the actuating collar 20 and conical clutch spring surface 22.

After accomplishment of the required number of reverse rotations of the shaft 6 at relatively low speed through the clutch spring 18 high speed (e. g. centrifuge operating) rotation of the shaft 6 in the same direction ($B^2$, Fig. 1) may be initiated by energizing the solenoid 26 and causing energization of the clutch spring 19 against the drum surface 17 by collar 20. During this high speed operation or at its start, if for any reason the coils 36 of the clutch spring 34 were to be dragged around as by friction with the drum surface 33 the clutch spring 34 would be thereby energized for locking the collar 31 to the hub of the now lagging gear 4 resulting in locking of the entire mechanism against rotation. The positive locking of the group of coils 37 in the braking pocket 38 whenever the rotation of the output shaft is according to arrow $B^2$ on Fig. 1 prevents any and all of the coils 36 from becoming self-energized onto the drum 33.

In the event of power failure while the clutch selecting and actuating collar 20 is in the position illustrated by Figure 1 (spinning cycle of operation), it will be evident that the de-energized solenoid 26 will allow the spring 29 to return the actuating collar into contact with the clutch spring 18 which will then be decelerating, with the already relatively slowly turning gear 4 in the direction of arrow B', which is the same direction as the shaft 6 sleeve 15, and collar 20 are being turned at relatively high speed in order to effect spinning of the tub or connected load. The mechanism "fails safe" because the direction in which the actuating collar is being turned by the momentum of the load is that which tends to expand the coils of right hand wound clutch spring 18 away from the drum surface 16. Thus the collar surface 21 overruns on the conical spring surface 22, and the inner friction surfaces of spring 18 remain in spaced relation to the drum surface 16.

Parts of the mechanism herein shown can, of course, be used without others. For example, the reversible coupling provided between the gear 4 and shaft 6 through the clutch springs 18 and 34 can be used to produce safe operation of the shaft 6 in opposite directions automatically consequent upon reversal of the drive shaft without having otherwise to provide for actuation and release of either clutch spring.

We claim:

1. In a transmission mechanism, a driving gear adapted to be turned in opposite directions, a driven gear in constant mesh therewith and having a clutch drum, a coaxial reversely rotatable output member having a cooperating clutch drum, a helical clutch spring automatic frictional torque transmitting connection with said drums for connecting the driven gear to the output member when the driving gear is turned in one direction only, stationary friction means acting continually on the clutch spring to impede rotation of the spring and maintain its coils in gripping relation to the drums consequent upon turning of the driven gear in said one direction, said friction means automatically locking the clutch spring against reverse rotation, a normally non-operating clutch between the driven gear and output member and actuator means to cause the last-mentioned clutch to transmit torque to the output member during the turning of the driving gear in the opposite direction.

2. The mechanism according to claim 1 wherein the clutch spring has coils radially strained against the clutch drum of the driven gear whereby to be self-energizing thereon, and has other coils radially adjacent the other drum but free from clutching engagement therewith in a relaxed condition of said other coils.

3. A gear and clutch mechanism comprising a drive member having two drive gears thereon, said member being adapted to be turned in opposite directions for power input to the mechanism, two coaxial driven gears constantly meshing with the drive gears respectively, forming separate gear couples of different ratios, an output member coaxial with the driven gears, clutch means selectively operable to connect the driven gears to the output member at said different ratios for operation of the output member during rotation of the drive member in one direction, an overrunning spring clutch mechanism separately and automatically connecting one of the driven gears to the output member consequent upon rotation of the drive member in the opposite direction, and means acting on the spring clutch mechanism to restrain it from automatic reverse drive clutching operation when the other driven gear is connected to the output member through said clutch means.

4. In combination with a constant mesh, plural ratio transmission gearing, having a plurality of driven gears and selectively operable overrunning clutch means arranged to couple the same to a common output shaft concentric therewith for driving the output shaft in one direction at different speeds, an overrunning clutch mechanism including a clutch spring and coacting drum means operatively connecting one of the gears and the output shaft, and friction means for automatically energizing the spring to connect said one gear and shaft consequent upon turning of said one gear to drive the output shaft in the opposite direction from that mentioned, said friction means operating on the clutch spring to prevent reverse transmission of torque therethrough from the output shaft to said gear.

5. A transmission mechanism comprising a reversibly rotatable drive member, two gear couples of different ratios with drive gear elements continually connected to the drive member and with respective driven gear elements permanently meshing therewith, an output member, clutch means arranged selectively to connect the driven elements of the gear couples drivingly to the output member for operation thereof when the drive member is rotated in one direction, and an overrunning spring clutch arranged for automatically connecting one of the driven gear elements to the output member when the drive member is reversely rotated, said overrunning clutch comprising a drum surface connected to turn with said one driven gear, a coaxial drum surface connected with the output member, a helical clutch spring with coils in self-gripping contact with the first drum surface while capable of overrunning thereon, said clutch spring having coils positioned to grip the coaxial drum surface, and braking means in overrunning friction pressure contact with a coil of the clutch spring for insuring such gripping of the coaxial drum surface and in friction locking relation with the same coil to deenergize, and prevent reverse rotation of the clutch spring.

6. In combination with a plural speed ratio, constant mesh gear mechanism having an output shaft arranged to deliver torque in opposite directions and selectively operable clutch means to couple gear elements of said mechanism thereto, a clutch drum on or rigid with one of said gear elements, a coaxial clutch drum on or rigid with the output shaft, a helical coil spring having main coils telescoping both drums and connectable therewith frictionally only whereby to enable overrunning operation of respective main coils with reference to one or the other of the clutch drums when the output shaft is being turned in one direction and gripping or locking operation of the main coils on the clutch drums when the output shaft is to be turned in the opposite direction, the spring having an energizing coil portion in addition to the main coils, and a brake drum in continual frictional overrunning energizing engagement with said energizing coil portion during the gripping operation of the main coils and clutch drums and in continual locking frictional engagement with said energizing coil portion during the overrunning operation.

7. In combination with a plural speed ratio, constant mesh reversible drive gear mechanism having an output shaft arranged to deliver torque in opposite directions and selectively operable relatively reversely acting clutch means to couple gear elements of said mechanism thereto, a clutch drum on or rigid with one of said gear elements, a coaxial clutch drum on or rigid with the output shaft, a helical coil spring having main coils telescoping both drums and connectable therewith frictionally only whereby to enable overrunning operation of respective main coils with reference to one or the other of the clutch drums when the output shaft is being turned in one direction and gripping or locking operation of the main coils on the clutch drums when the output shaft is to be turned in the opposite direction, the spring having energizing coils extending axially of the spring beyond the clutch drum of the output shaft, and a brake drum in continual frictional overrunning energizing engagement with said energizing coils during the gripping operation of the main coils and clutch drums and in continual locking frictional engagement with said energizing coils during the overrunning operation.

8. In a transmission, a drive shaft, a driven shaft, high and low speed gear trains for driving said driven shaft from said drive shaft, a sleeve keyed to said driven shaft intermediate the driven gears of said gear trains, a self-wrapping spiral clutch spring secured to each of said driven gears and having their respective free ends extending over said sleeve, and shift collar means axially movable upon said sleeve and rotatable therewith for engaging at will one or the other of the free ends of said springs to cause friction driving engagement thereof with said sleeve, a second sleeve keyed to said driven shaft adjacent said low speed driven gear, an internal stationary friction surface adjacent said second sleeve on the other side thereof from said driven gear, said low speed gear having a hub having a friction surface adjacent said second sleeve, and a clutch spring extending across said hub, second sleeve and internal surface, said spring having light frictional engagement with said hub and internal surface.

9. In a transmission, a drive shaft, a driven shaft, high and low speed gear trains for driving said driven shaft from said drive shaft, a sleeve keyed to said driven shaft intermediate the driven gears of said gear trains, a self-wrapping spiral clutch spring secured to each of said driven gears and having their respective free ends extending over said sleeve, shift collar means axially movable upon said sleeve and rotatable therewith for engaging either one or the other of said free ends of said springs to cause friction driving engagement thereof with said sleeve, means biasing said collar for engagement with the low speed spring, and electromagnetic means for overcoming said biasing means and engaging the other of said springs, a second sleeve keyed to said driven shaft adjacent said low speed driven gear, an internal stationary friction surface adjacent said second sleeve on the other side thereof from said driven gear, said low speed gear having a hub having a friction surface adjacent said second sleeve, and a clutch spring extending across said hub, second sleeve and internal surface, said spring having light frictional engagement with said hub and internal surface.

10. In a transmission, a drive shaft, a driven shaft, high and low speed gear trains for driving said driven shaft from said drive shaft, clutch means comprising an element keyed to said driven shaft intermediate the driven gears of said gear trains for clutching one or the other of said driven gears, a sleeve keyed to said driven shaft adjacent said low speed driven gear, an internal stationary friction surface adjacent said sleeve on the other side thereof from said driven gear, said low speed gear having a hub having a friction surface adjacent said sleeve, and a clutch spring extending across said hub, sleeve and internal surface, said spring having light frictional engagement with said hub and internal surface.

11. In a transmission, a frame, a drive shaft, a driven shaft journaled in said frame, high and low speed gear trains for driving said driven shaft from said drive shaft, overrunning clutch means for securing the driven gears of said gear trains selectively to said driven shaft, when such gears rotate in one direction, and overrunning clutch means independent of said first-named clutch means coacting with the slow speed driven gear, driven shaft and frame for driving said driven shaft from said low speed driven gear when rotating in the other direction only.

12. In a transmission, a frame, a drive shaft, a driven shaft journaled in said frame, high and low speed gear trains for driving said driven shaft from said drive shaft, overrunning clutch means for securing the driven gears of said gear trains selectively to said driven shaft, when such gears rotate in one direction, overrunning clutch means coacting with the slow speed driven gear, driven shaft and frame for driving said driven shaft from said low speed driven gear when rotating in the other direction, said last-named clutch means comprising a coil spring having its ends frictionally engaging spring-engaging surfaces on said low speed gear and frame, and an intermediate portion adapted to engage a friction surface affixed for rotation with said driven shaft.

STANLEY F. GORSKE.
CARL P. PEPPER.

REFERENCES CITED

The following references are of record in the file of this patent:

UNITED STATES PATENTS

| Number | Name | Date |
|---|---|---|
| 1,843,523 | Starkey | Feb. 2, 1932 |
| 1,939,730 | Starkey | Dec. 19, 1933 |
| 1,974,267 | Galloway | Sept. 18, 1934 |
| 2,140,975 | Welch | Dec. 20, 1938 |
| 2,185,731 | Hubbell | Jan. 2, 1940 |
| 2,302,312 | Greenlee | Nov. 17, 1942 |
| 2,369,334 | Brotman | Feb. 13, 1945 |
| 2,396,985 | Burrus | Mar. 19, 1946 |
| 2,456,600 | Trout | Dec. 14, 1948 |